June 18, 1929.  J. H. SPANGLER  1,717,632
SPEED CHANGING TRANSMISSION DEVICE
Filed Jan. 14, 1926   8 Sheets-Sheet 1
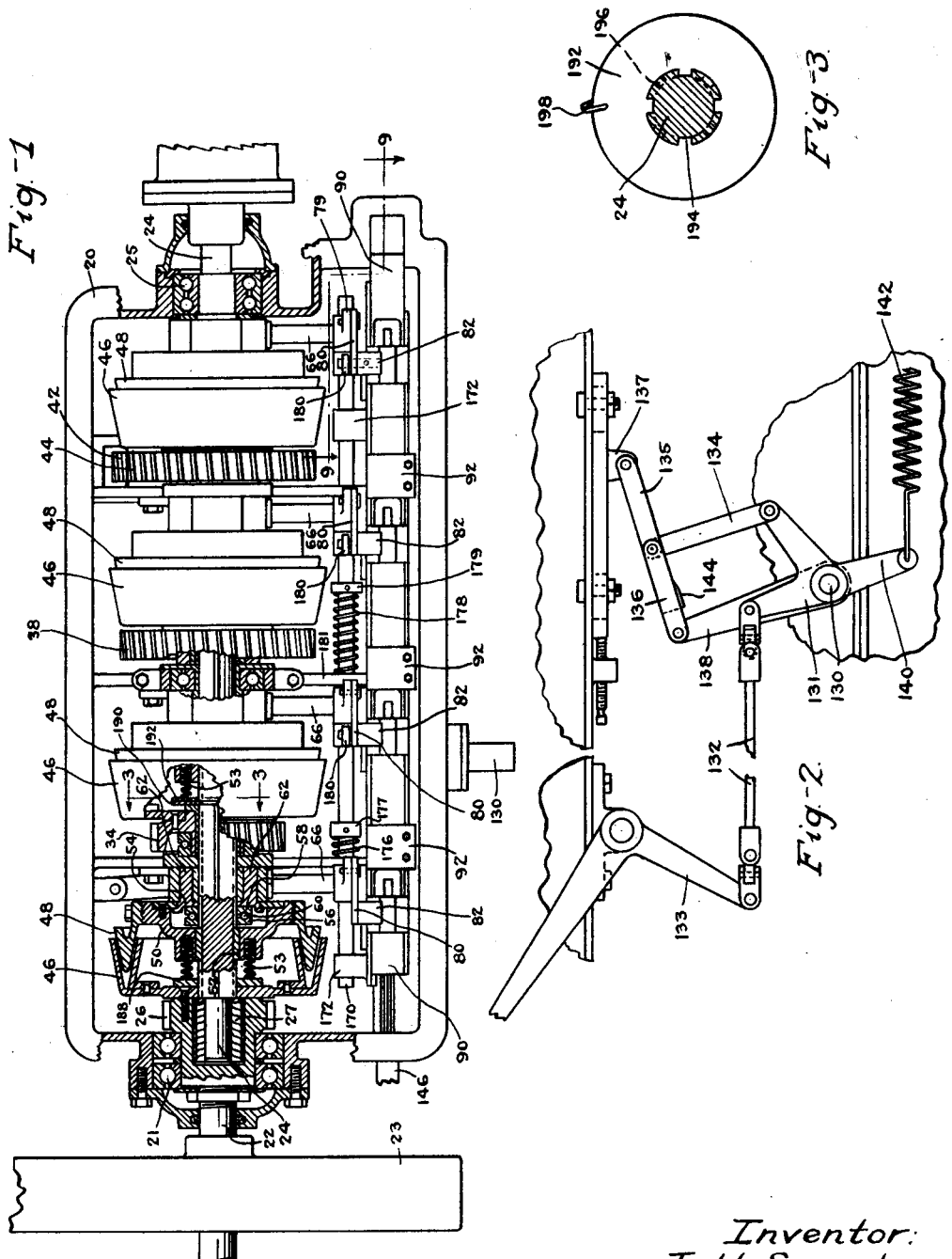
Inventor:
J. H. Spangler.
By Whiteley and Ruckman
Attorneys.

June 18, 1929.  J. H. SPANGLER  1,717,632
SPEED CHANGING TRANSMISSION DEVICE
Filed Jan. 14, 1926   8 Sheets-Sheet 2
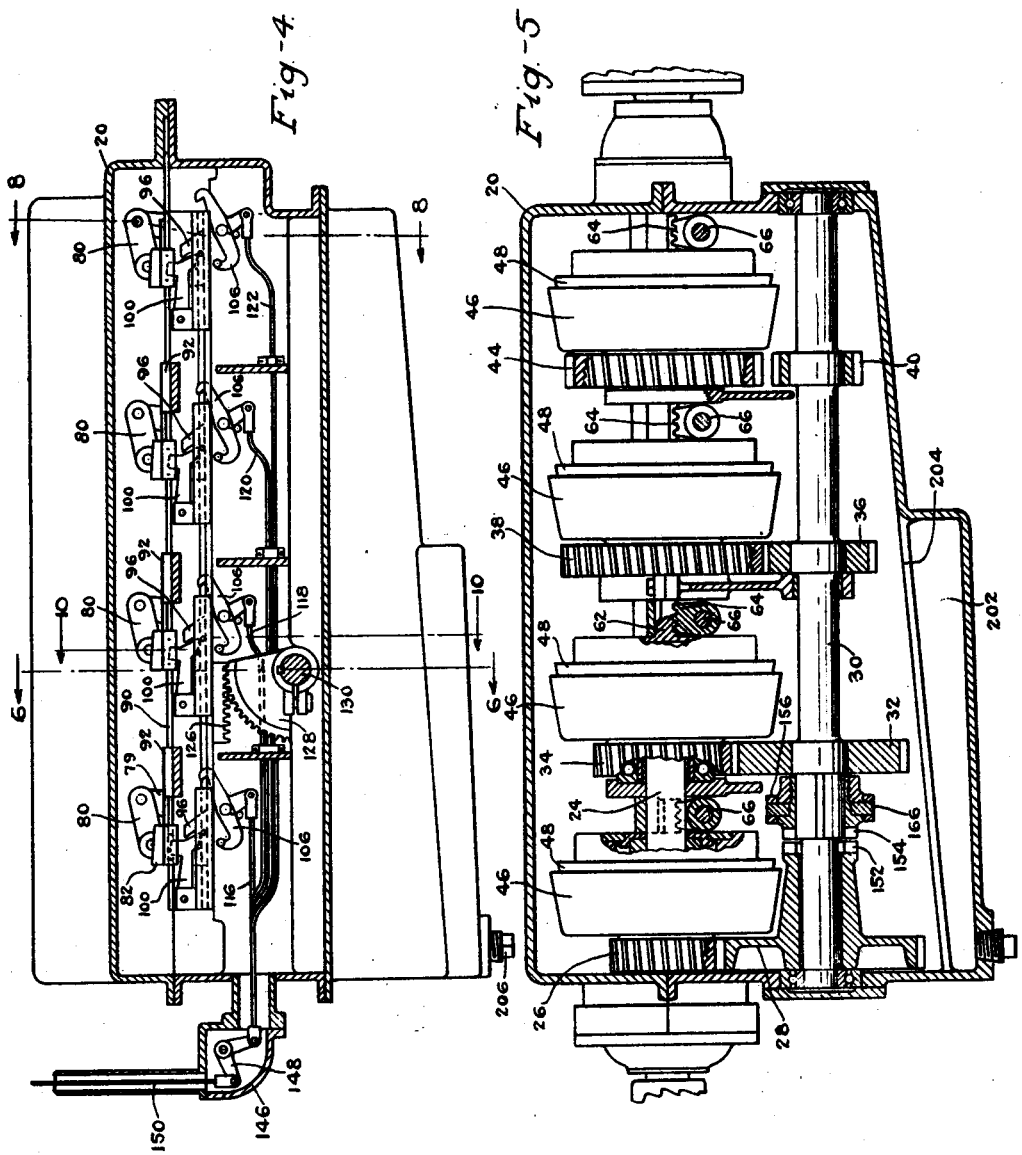
Inventor:
J. H. Spangler
By Whiteley and Ruckman
Attorneys.

June 18, 1929.  J. H. SPANGLER  1,717,632
SPEED CHANGING TRANSMISSION DEVICE
Filed Jan. 14, 1926  8 Sheets-Sheet 3

Inventor:
J. H. Spangler.
By Whiteley and Ruckman
Attorneys.

June 18, 1929.   J. H. SPANGLER   1,717,632
SPEED CHANGING TRANSMISSION DEVICE
Filed Jan. 14, 1926   8 Sheets-Sheet 4

Inventor:
J. H. Spangler.
By Whiteley and Ruckman
Attorneys.

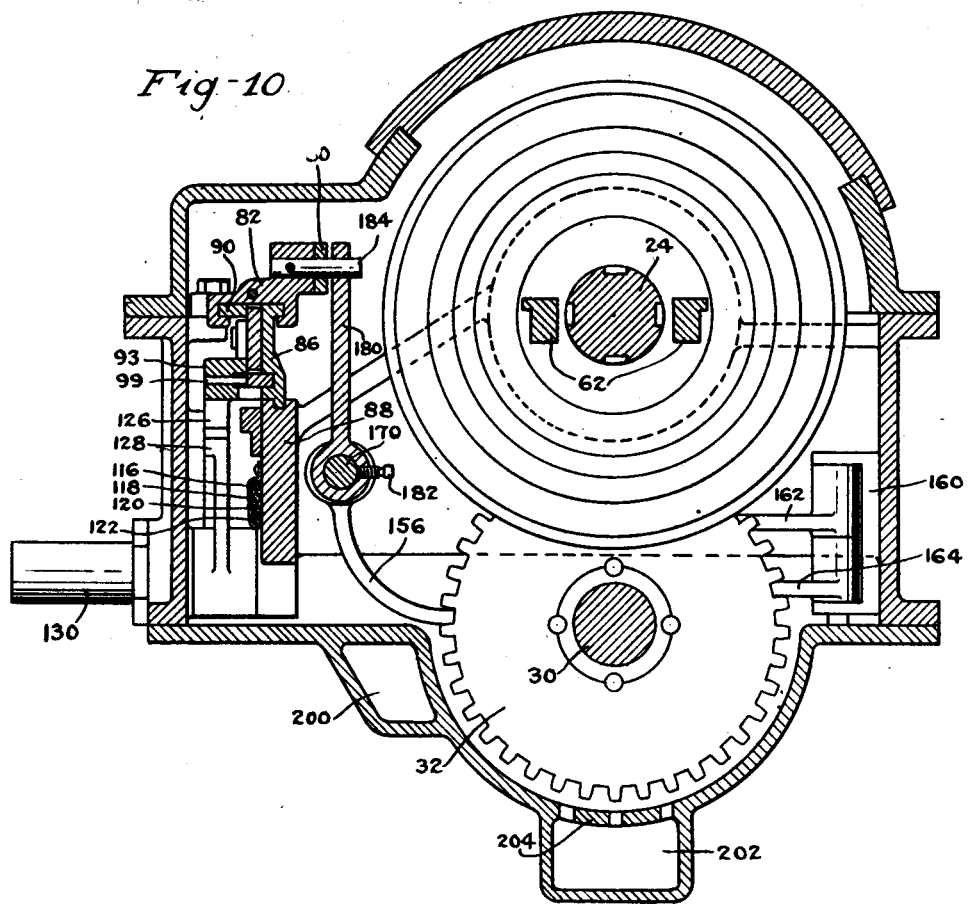
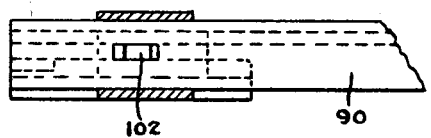
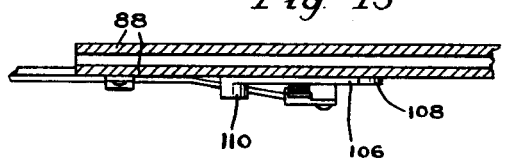
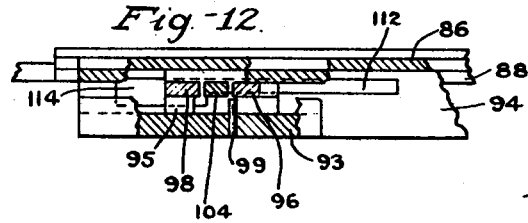

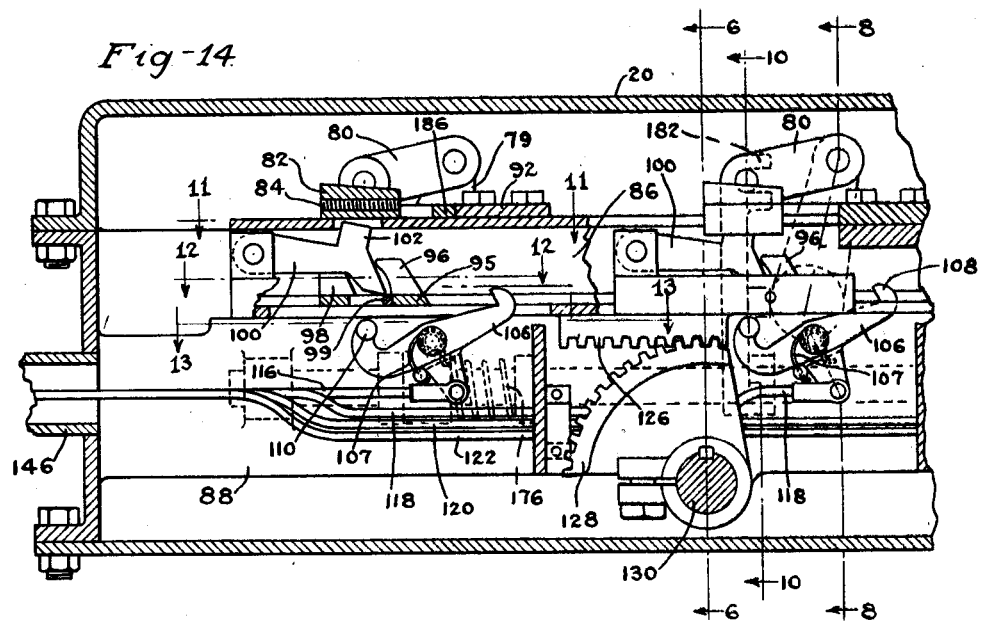

June 18, 1929.   J. H. SPANGLER   1,717,632
SPEED CHANGING TRANSMISSION DEVICE
Filed Jan. 14, 1926   8 Sheets-Sheet 7

Inventor:
J. H. Spangler.
By Whiteley and Ruckman
Attorneys.

June 18, 1929.　　　J. H. SPANGLER　　　1,717,632
SPEED CHANGING TRANSMISSION DEVICE
Filed Jan. 14, 1926　　8 Sheets-Sheet 8

Inventor:
J. H. Spangler,
By Whiteley and Ruckman
Attorneys

Patented June 18, 1929.

1,717,632

UNITED STATES PATENT OFFICE.

JOHN H. SPANGLER, OF MINNEAPOLIS, MINNESOTA.

SPEED-CHANGING TRANSMISSION DEVICE.

Application filed January 14, 1926. Serial No. 81,202.

My invention relates to speed changing transmission devices and among the objects are to provide a device whereby different speeds and reverse may be selectively obtained without shock and jar, and without liability of stripping gears.

I accomplish the objects of the invention by providing a construction in which no shifting of gears is involved, but in which clutch mechanisms for the various speeds and for reverse are operated by the driver according to the manner in which he wishes to operate the vehicle.

The full objects and advantages of my invention will appear in connection with the detailed description thereof, and the novel features of my inventive idea will be particularly pointed out in the claims.

In the accompanying drawings which illustrate one form in which my invention may be embodied,—

Figure 6:
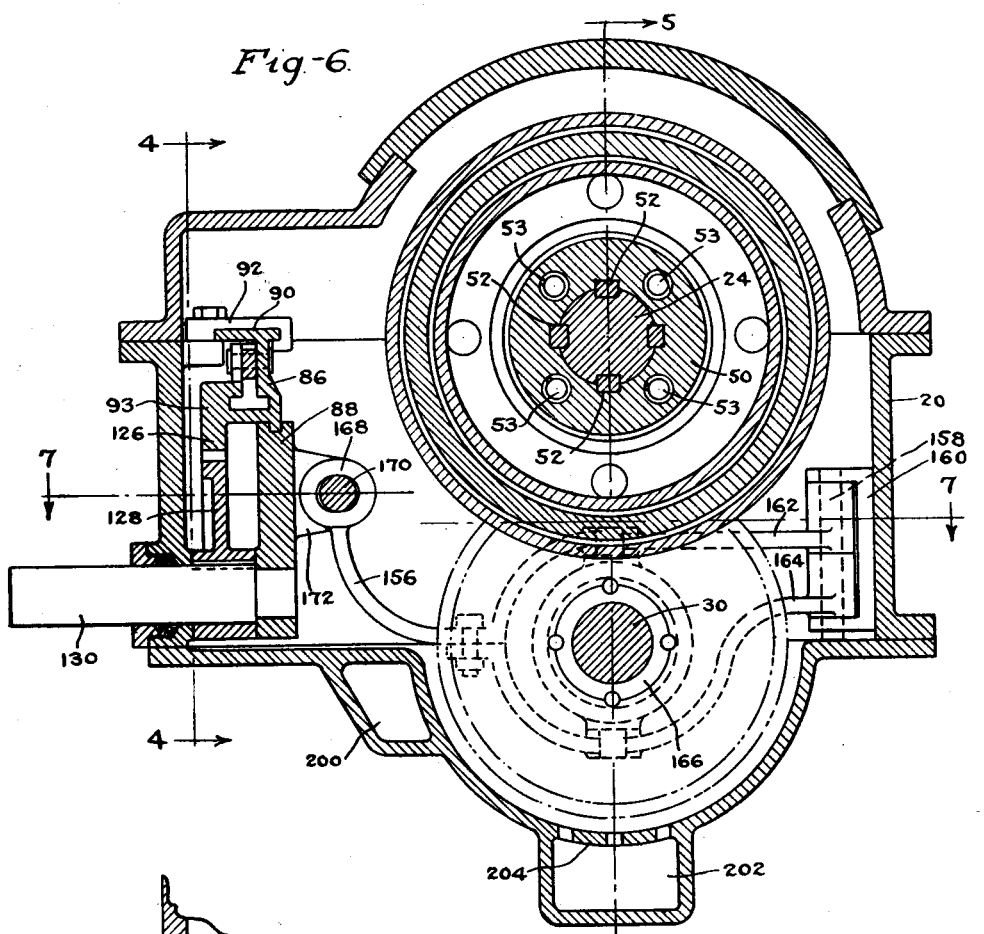
Figure 7:
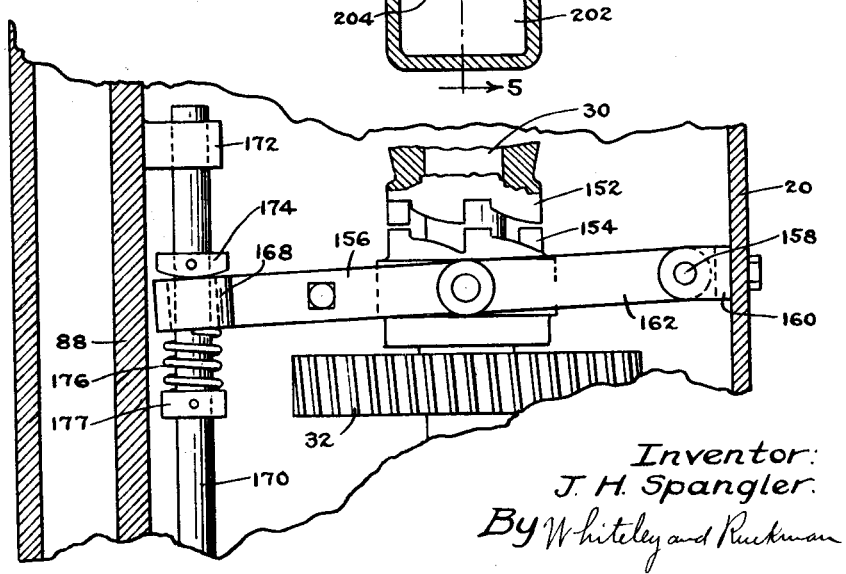
Figure 8:
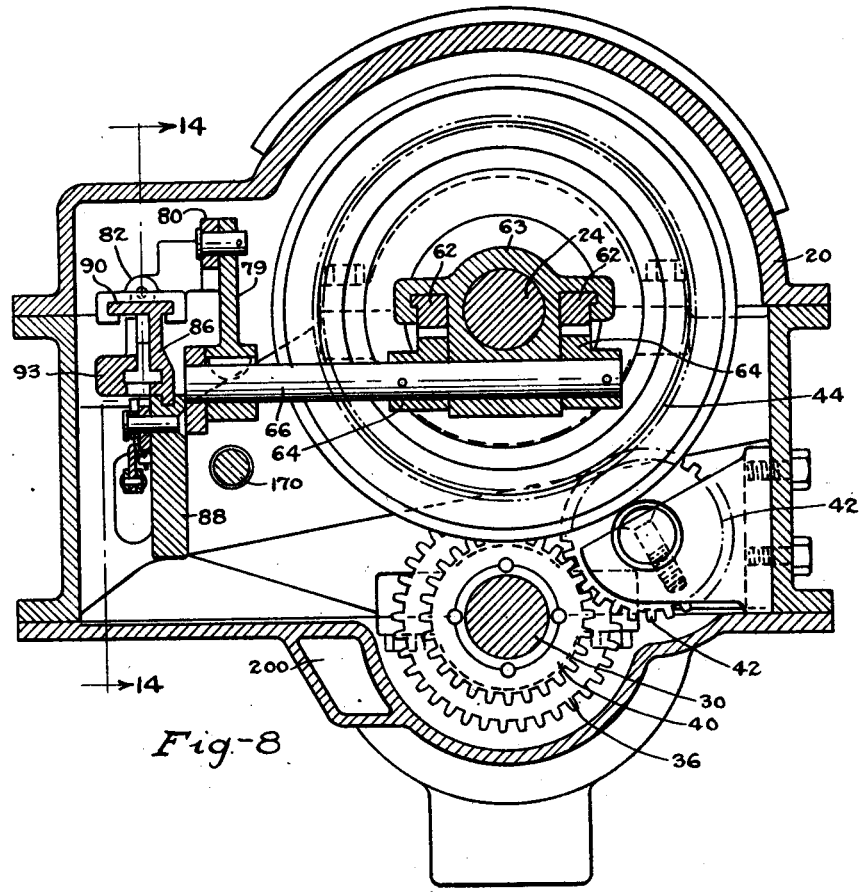
Figure 9:
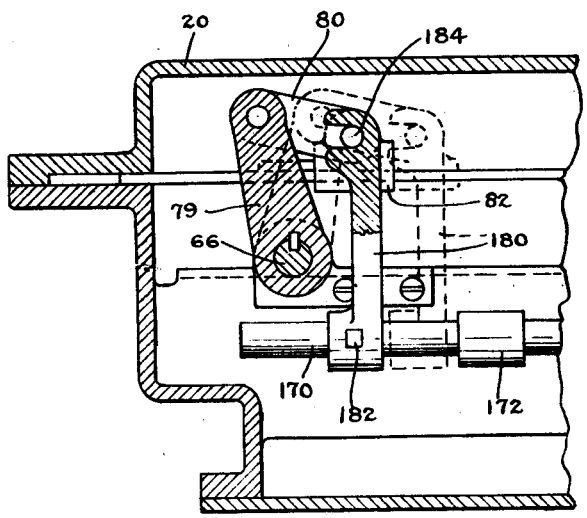
Figure 16:
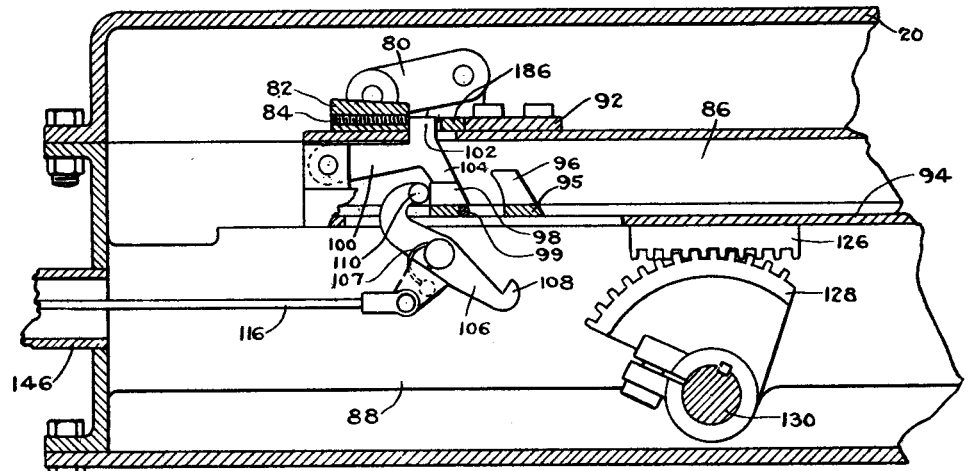
Figure 17:
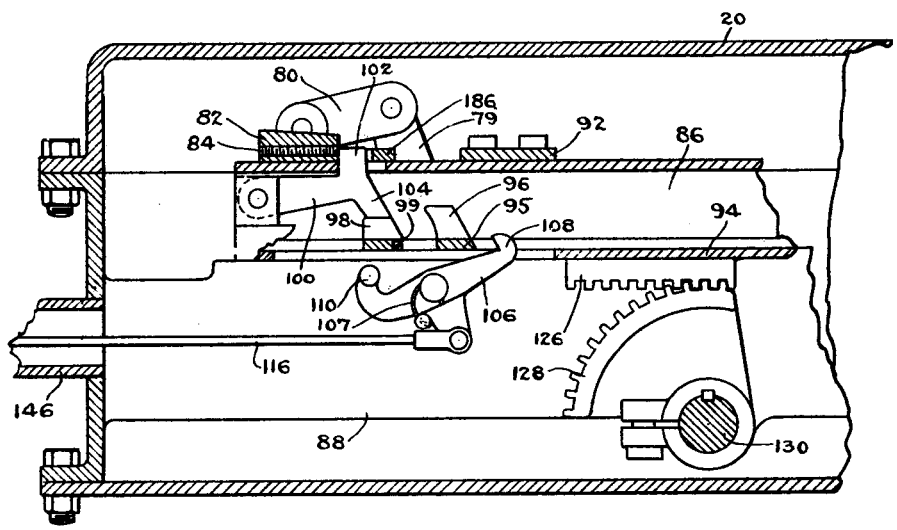
Figure 18:
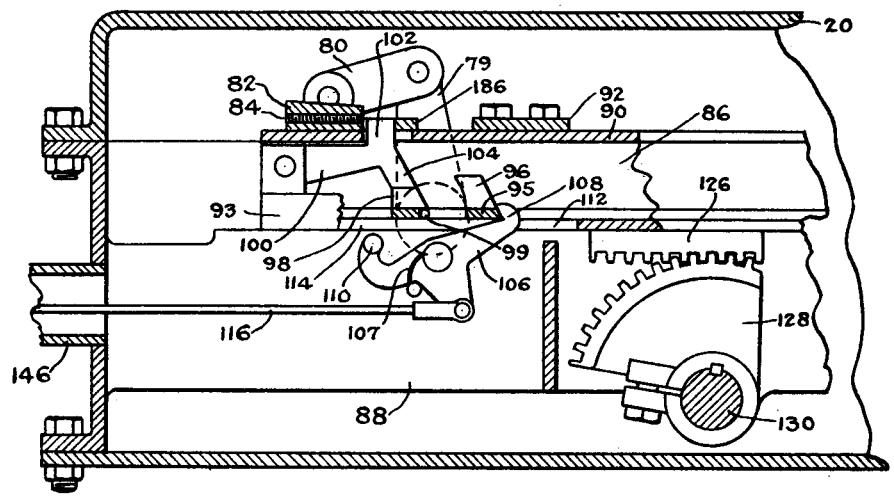
Figure 19:
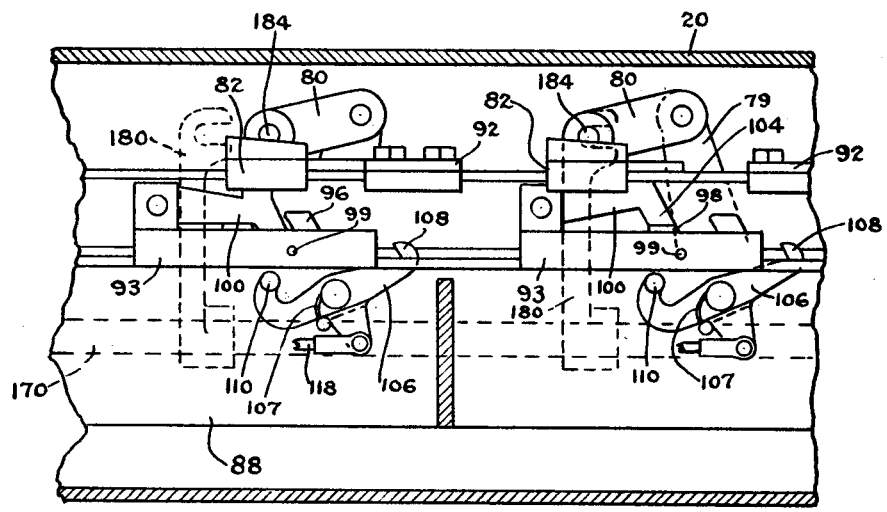

Fig. 1 is a top plan view of the transmission device with a portion thereof in horizontal section. Fig. 2 is an elevational view showing the connection of the foot pedal with the transmission device. Fig. 3 is a view in section on the line 3—3 of Fig. 1. Fig. 4 is a view in section on the line 4—4 of Fig. 6. Fig. 5 is a view in section on the line 5—5 of Fig. 6. Fig. 6 is a view in section on the line 6—6 of Figs. 4 and 14. Fig. 7 is a view in section on the line 7—7 of Fig. 6. Fig. 8 is a view in section on the line 8—8 of Fig. 4. Fig. 9 is a view in section on the line 9—9 of Fig. 1. Fig. 10 is a view in section on the line 10—10 of Figs. 4 and 14. Fig. 11 is a view in section on the line 11—11 of Fig. 14. Fig. 12 is a view in section on the line 12—12 of Fig. 14. Fig. 13 is a view in section on the line 13—13 of Fig. 14. Fig. 14 is a view in section on the line 14—14 of Fig. 8 and showing the parts in what will hereafter be referred to as neutral position, the foot pedal now being up. Fig. 15 is a similar view showing the parts in the position they assume when the foot pedal is down with a dog ready to be lifted. Fig. 16 is a similar view, the foot pedal still being down and the driver having operated a device so that the dog is moved up for engagement with a slide. Fig. 17 is a similar view, the foot pedal having been released and a clutch having been operated. Fig. 18 is a similar view, the foot pedal having been moved sufficiently to release the clutch but not sufficiently to release the dog. Fig. 19 is a similar view showing some parts in a still different position.

Referring to the construction shown in the drawings and first, more particularly to Fig. 1, the numeral 20 designates in general a transmission casing in the forward end of which is a ball bearing device 21 within which the rear enlarged end of the motor shaft 22 rotates, said shaft being provided with the customary fly wheel 23. A rearwardly projecting drive shaft 24 is rotatably mounted in a ball bearing device 25, and this latter shaft extends forwardly through the casing 20 and has its front end rotatably mounted within roller bearings 27 located in a recess in the enlarged rear end of the shaft 22. Fixed upon the rear end of the shaft 22 within the transmission casing is a gear 26 which as shown in Fig. 5 meshes with a gear 28 rotatably mounted on a counter shaft 30 which is rotatably mounted in the lower portion of the casing 20. Secured to the counter shaft 30 is a gear 32 which meshes with an intermediate speed gear 34 loosely mounted on the shaft 24. A gear 36 secured to the counter shaft 30 meshes with a slow speed gear 38 loosely mounted on the shaft 24. A gear 40 secured to the counter shaft 30 meshes with an idler gear 42 as shown in Fig. 8, this latter gear being in mesh with a reversing gear 44 loosely mounted on the shaft 24. All of these gears are preferably spiral gears. It will be understood that when the device is in neutral position, the motor shaft 22 will rotate without imparting any rotation to the shaft 24, the gear 26 simply rotating the gear 28. For high speed, the shaft 22 is clutched directly to the shaft 24, while for other speeds, the gear 28 is clutched to the counter shaft 30 by mechanism which will be described later. Also for intermediate speed, the gear 34 is clutched to the shaft 24 and for slow speed, the gear 38 is clutched to the shaft 24, while for reverse, the gear 44 is clutched to the shaft 24. Similar clutching mechanisms are employed in connection with the four gears 26, 34, 38, and 44 positioned on the shaft 24, and the clutching mechanism will now be described in detail with reference more particularly to the high speed control shown in section in Fig. 1. The same reference characters will be employed so far as applicable for the other speed controls. A drum 46 preferably of double cone construction as shown is secured to the end of the motor shaft 22 adjacent the gear 26, this double rim drum constituting one member of a clutch. Arranged for cooperation with this clutch member is an annular wedge shaped clutch member 48 which is threaded upon the periphery of a flanged annular member 50 having keys 52 by which it is splined on the shaft 24. Springs 53 fitting into sockets in the hub 52 tend to keep the two clutch members separated. Slidably mounted on the shaft 24 between the member 50 and an annular plate 54 is a ball bearing device consisting of two spaced thrust rings 56 and 58 between which there is a circular row of balls 60. The ring 56 may rotate with the shaft and with the member 50 while the ring 58 is stationary so that the shaft 24 rotates therein. Projecting rearwardly from the plate 54 is a pair of racks 62 slidably supported by a fixed member 63 in the manner best shown in Fig. 8. These racks are engaged by segmental gears 64 secured to a rock shaft 66 which carries a rocker arm 79 which is connected by a link 80 with a slide 82 the shape of which is best shown in Figs. 8 and 10. It will be understood that there are four of these slides, one associated with each of the four clutch mechanisms. A screw 84 extends lengthwise through the slide 82 in order that an adjustable engagement may be provided for a dog which will soon be described. The slides 82 are slidable on a bar 86 which extends for the greater portion of the length of the casing, this bar being in turn slidable upon a fixed bar 88 secured within the casing. The slidable bar 86 is angular in cross section as shown in Figs. 6 and 8, having a top horizontal flange 90 upon which the slides 82 rest and the body portion of this bar is off-set toward the bottom and rests in a groove in the top of the fixed bar 88 so that said groove constitutes a slideway. The bar 86 is held in place by recessed strips 92 secured to the casing and into the recessed portions of which the flange 90 fits. The bar 86 is provided near its bottom with four lateral projections 93 spaced along the length thereof and connected thereto by webs 94, as seen in Fig. 12. The projections 93 cooperate with the body portion of the bar 86 to form slideways for four slides 95, each having an upward projection 96 at the rear end and an upward projection 98 at the front end. It will be noted that the lateral projections 93 carry pins 99 which project into cut-out portions of the slides 95 so as to be capable of engaging either the front or rear wall of the cut-out portion as is apparent from Figs. 15 and 16. Four dogs 100 are pivoted to the bar 86 and these dogs have upward projections 102 which when the dogs are lifted, are caused to project through slots in the flange 90 of the bar 86 and engage the ends of the screws 84 carried by the slides 82 provided said slots are not covered by said slides. The dogs 100 also have downward projections 104 which are engaged by the projections 98 of the slides 95 when said slides are moved rearwardly. In order to move the four slides 95, four levers 106 are intermediately pivoted to the fixed bar 88 and normally held in the inclined position of Fig. 14 by springs 107. The rear arm of each of these levers has a narrow upward projection 108 and the forward arm has a wide projection 110. By referring to Fig. 12, it will be seen that the web 94 contains a slot, the rear portion 112 of which is narrow and the forward portion 114 of which is considerably wider. The wide projection 110 can be moved up through the wide portion 114 of the slot but not through the narrow portion 112 thereof, although the narrow projection 108 can be moved up through the narrow portion of the slot. The levers 106 normally occupy the position shown in Fig. 14. In order to rock these levers, wires are attached to downwardly extending lugs carried by the levers. A wire 116 is attached to the lever 106 associated with the high speed control, a wire 118 is attached to the lever associated with the intermediate speed control, a wire 120 is attached to the lever associated with the slow speed control, and finally, a wire 122 is attached to the lever associated with the reversing control. These wires are suitably supported and placed in a tube which extends forwardly and carries the wires to a position within easy reach of the driver. The slidable bar 86 normally occupies a forward position as shown in Fig. 14. In order to slide it rearwardly, it is provided with a downwardly extending rack 126 meshing with a segmental gear 128 secured to a shaft 130. As shown in Fig. 2, a bell crank lever 131 is loosely mounted at its elbow on the shaft 130. One arm of the bell crank is pivotally attached to the rear end of a link 132 whose forward end is attached to the lower end of a foot pedal lever 133. The other arm of the bell crank 131 is pivotally attached to the lower end of a link 134 whose upper end is pivotally attached to the common point of a pair of toggle arms 135 and 136. The outer end of the arm 135 is pivotally attached to an adjustable bracket 137 while the outer end of the arm 136 is pivotally attached to the upper arm 138 of a lever which is secured at an intermediate point to the shaft 130. The lower arm 140 of this lever has a coiled spring 142 secured thereto which normally holds the foot pedal upwardly. The toggle arm 135 extends part way past the toggle arm 136 and has a projection 144 on its under side which engages the under side of the arm 136, thus preventing the arms from being deflected upwardly beyond their straight-line position. The arms 135 and 136 will remain in their straight-line position except when downwardly deflected by the driver pushing down on the foot pedal. Jolting of the car will not move these arms out of their straight-line position and, hence, there is no tendency for the clutches to be jolted out of their clutching engagement. In the preferred embodiment of the invention, the wires 116, 118, 120 and 122 previously referred to, are rodlike to provide adequate strength and they extend forwardly through an opening in the front wall of the casing 20 into a small casing 146, as shown in Fig. 4, and are connected to one of the ends of bell crank levers 148, the other ends of which are connected by flexible wires 150 to movable finger pieces such as disclosed in my prior application Serial Number 27,764 filed May 4, 1925, which has matured into Patent #1,671,323. The finger pieces are mounted in suitable manner within easy reach of the driver. As previously explained, when the device is in neutral, the motor shaft 22 by means of its attached gear 26 simply rotates the gear 28 which is loose on the countershaft 30 without rotating this latter shaft. For high speed, the wire 116 is pulled which operates the forward one of the four similar clutch members 48, thereby clutching the shaft 22 directly to the shaft 24 without imparting rotation to the counter shaft 30. For other speeds, and for reverse, it is necessary to rotate the counter shaft and this result is accomplished by mechanism now to be described. As shown in Figs. 5 and 7, a jaw clutch member 152 is secured to the gear 28 and a cooperating jaw clutch member 154 is splined on the shaft 30. A shifting lever 156 is pivoted at one end on a vertical pivot 158 mounted in a bracket 160 secured to the inside of the casing 20. As shown in Fig. 6, this end portion of the lever is made in two curved parts 162 and 164 which encircle a ring 166 rockably supported therein. As shown in Fig. 5, the ring 166 lies in an annular groove around a sleevelike portion of the clutch member 154. The other end of the lever 156 has a ring portion 168 which encircles a rod 170 slidably mounted in ears 172 mounted on the inside of the fixed bar 88. As shown in Fig. 7, the ring portion 168 of the lever is held against an abutment 174 which is secured to the rod 170, a coiled spring 176 being interposed between the ring portion and an abutment 177 also secured to the rod 170. The spring 176 will yield if the jaw clutches do not come together into interfitting engagement when the member 154 is moved and thereafter when the member 152 has made a portion of a rotation, will cause the member 154 to be forced home. A coiled spring 178 surrounds the rod 170 as shown in Fig. 1 and is interposed between a collar 179 secured to the rod and a fixed cross member 181 through which the rod 170 passes slidably. The spring 178 will retract the rod 170 to disengage the clutch member 154 when the rod is free to move backwardly. The rod 170 is moved forwardly at the proper time by devices now to be described. Three upwardly extending arms 180 are secured to the rod 170 by set screw 182. The upper ends of the arms 180 have recesses adapted to receive pins 184 by which the links 80 are pivoted to the slides 82, these pins being extended for this purpose in regard to the mechanism for intermediate and low speeds, and for reverse. It is obvious that no such arm is necessary for operation in connection with the high speed mechanism since the clutch member 154 is not operated for obtaining this speed. When any one of the three slides associated with the intermediate and low speeds and reverse is moved forwardly, the pin 184 associated therewith will engage the adjacent arm 180 and cause the rod 170 to move forwardly. The slides 82 instead of terminating with the raised portions which carry the screws 84 are preferably extended rearwardly by portions of reduced thickness having slots ending in rear walls 186 which when the slides are moved into rearward position engage the fixed strips 92 which constitute stops for the slides. By referring to Fig. 1, it will be seen that the forward ends of the springs 53 associated with the high speed clutch engage a ring 188 lying against the wall of the clutch member 46. For other speeds and for reverse, however, it is desirable to provide different means for engagement by the forward ends of the springs 53. For this purpose, two disks 190 and 192 are provided each having four inward projections 194 as shown in Fig. 3. The projections 194 when the device is assembled are adapted to slide in the key-ways of the shaft 24 while at the proper places along the shaft circumferential grooves 196 are provided into which the projections of one of the disks may be turned. When one of the disks has thus been turned, a wire 198 passed through the two disks serves to prevent them from longitudinal movement on the shaft. By referring to Figs. 6, 8, and 10, it will be seen that the transmission casing is provided with a passage 200 through which exhaust gases from the motor may pass in order to warm the oil in the casing. A portion of the bottom of the casing is depressed as shown in Figs. 5, 6, and 10 to produce a settling chamber 202 which is separated from the interior of the casing by a perforated partition 204. Grit and metallic particles will pass through the perforations into the settling chamber where they cannot be stirred up by the rotation of the gears, thus insuring a supply of oil for the gears free from such particles. A plug 206 is provided in the bottom of the settling chamber for draw-off purposes.

The operation and advantages of my invention will be apparent in connection with the foregoing description. Referring to Fig. 14 which represents the neutral position, the foot pedal is now up and the bar 86 is in left-hand position due to the action of the spring 142. Finger pieces located near the driver are all in "off" position and none of the levers 106 can be operated, since the wide ends 110 thereof are underneath the narrow portions 112 of the slots in the web 94. The driver depresses the foot pedal and this moves the bar 86 toward the right into the position shown in Fig. 15, the extent of this movement being limited by the slides 95 coming into engagement with the upwardly projecting ends 108 of the levers 106. The wide ends of these levers are now under the wide portions of the slots so that the levers can be rocked. The driver keeps his foot on the pedal and moves the desired one of the finger pieces. This moves the end 110 of the lever 106 upwardly and said end engages the slide 95 and moves it into the position shown in Fig. 16, the extent of movement being limited by the pin 99. The movement of the slide 95 causes its projection 98 to lift the dog 100 and then the projecting end 102 thereof engages the rear of the thick portion of the slide 82, or more strictly speaking, the adjusting screw 84 carried thereby. The driver then releases the foot pedal and the spring 142 then causes the bar 86 to move back into its original position as shown in Fig. 17. But the dog 100 is now held up in engagement with the slide 82 which is caused to move toward the left as shown in this latter figure and the rocker arm 79 is rocked, thereby partially rotating the shaft 66 to which it is secured and causing the clutch member 48 to be moved in the manner previously described. It will be understood that any one of the four levers 106, but only one of them at a time, may be operated to secure any one of the three speeds or reverse as desired. The shifting of the forward one of the clutch members 48 is all that is necessary to cause operation at high speed. The parts will be maintained in the position shown in Fig. 17 until the foot pedal is again depressed. When this is done, the bar 86 is moved toward the right and the dog 100 carried thereby drops with its projection disposed between the projections 96 and 98 of the lever 106 slide 95, since the end 108 of this slide and the bar 86 can continue moving until the pin 99 engages the rear wall of the slot in the slide 95. This action causes the slide 82 to move into normal position and release the clutch. By referring to Fig. 17, it is evident that before the dog 100 drops, the projection 102 thereon will engage the rear wall 186 of the slide 82 and thus assist in causing the rocker arm 79 to move from the position shown in Fig. 17 back to that shown in Fig. 14. With the foot maintained on the pedal, any other finger piece may now be operated to secure one of the other speeds or reverse. However, in case the driver instead of going into some other speed or into reverse, wishes to release the clutch member 48 temporarily, and then pick up the same speed, he does not depress the foot pedal to the full extent but only partly depresses it so that the parts assume the position shown in Fig. 18. This moves the dog 100 far enough to the right to permit the slide 82 to also move to the right and allow the arm 79 to rock but not far enough for the dog to drop off the projection 98. Therefore, upon removing the foot from the pedal, the dog will again engage the slide 82 so that the arm 79 is rocked back into clutching position. The description thus far explains the complete operation in connection with high speed but for other speeds and reverse, it is necessary to combine with the operation of the proper one of the clutch members 48, the operation of the clutch member 154 to bring it into clutching engagement with the clutch member 152. This operation will be understood from Figs. 7, 9, 10, and 19 upon observing that Fig. 9 is a view in section on the line 9—9 of Fig. 1 looking in the direction indicated by the arrows and hence, the direction of movement of the moving parts in Fig. 9 is reversed from that in Fig. 19. When any one of the slides 82 other than that for high speed is moved forwardly in the manner already described, the projecting pin 184 by engaging in the recess of the arm 180 causes the latter and the rod 170 to move forwardly and shift the clutch member 154. The extent of movement of the arm 180 is indicated by the dotted line position thereof in Fig. 9. It will be understood from Fig. 19, that the dog 100 is being held in raised position to maintain the slide 82 in its left-hand position, thereby keeping the clutch on the counter shaft 30 as well as that on the shaft 24 in clutching position. It will also be understood from Fig. 19 that when any one of the arms 180 are moved by a pin 184, the other arms 180 are free to move independently of the associated pins 184. By referring to Fig. 7, it will be seen that the clutch members 152 and 154 are so constructed that the projections of one member will be held in the notches of the other member so that the clutch members will be kept in clutched engagement when the car is going down hill as well as when going up hill. This enables the motor to be used as a brake when going down hill upon turning off the supply of gas and placing the mechanism in either low or intermediate speed position. With this mechanism, all shifting of gears with liability of stripping the same is obviated, and due to the fact that when any one of the different speed clutches is engaged, there will be slipping thereof momentarily, shocks and jars are avoided in starting, in changing speeds, and also in regard to reverse. The speed of the drive member of the clutch is, however, quickly although gradually imparted to the driven member of the clutch. The mechanism is easily and quickly operated by the driver by simple manipulation of the foot pedal and finger pieces so that he is relieved of the necessity of reaching forward to grasp and manipulate the customary gear shift lever now in common use.

I claim:

1. In a speed changing transmission device for motor vehicles having a motor shaft and a drive shaft, the combination of a clutch normally held in inoperative position, means for operating said clutch for clutching said motor shaft directly to said drive shaft for high speed, a counter shaft parallel with said drive shaft, a second clutch normally held in inoperative position, means for operating said second clutch independently of said first clutch for causing said counter shaft to be driven from the motor shaft, and clutches between said counter shaft and said drive shaft for operating the latter for intermediate and slow speeds and for reverse respectively from said counter shaft when said second clutch is engaged.

2. In a speed changing transmission device for motor vehicles having a motor shaft and a drive shaft, the combination of a counter shaft parallel with the drive shaft, a gear secured to said motor shaft, a gear loose on said counter shaft meshing with said first gear, a clutch member carried by said loose gear, a cooperating clutch member splined on said countershaft, means for sliding said last mentioned clutch member for clutching said loose gear to said counter shaft, gears for intermediate and slow speeds and for reverse loosely mounted on said drive shaft, gears secured to said counter shaft for driving said loose gears respectively, and clutches for independently clutching said loose gears and said motor shaft to said drive shaft.

3. In a speed changing transmission device for motor vehicles having a motor shaft and a drive shaft, the combination of a counter shaft parallel with the drive shaft, a gear secured to said motor shaft, a gear loose on said counter shaft meshing with said first gear, a clutch for clutching said loose gear to said counter shaft, means for normally holding said clutch in inoperative position, gears for intermediate and slow speeds and for reverse loosely mounted on said drive shaft, gears secured to said counter shaft for driving said loose gears respectively, clutches for independently clutching said loose gears and said motor shaft to said drive shaft, means for selectively operating said clutches, and means for causing said first clutch to be operated when any one of the clutches associated with said loose gears is operated.

4. In a speed changing transmission device for motor vehicles having a motor shaft, a drive shaft and a foot pedal, the combination of a counter shaft parallel with the drive shaft, a gear secured to said motor shaft, a gear loose on said counter shaft meshing with said first gear, a clutch for clutching said loose gear to said counter shaft, gears for intermediate and slow speeds and for reverse loosely mounted on said drive shaft, gears secured to said counter shaft for driving said loose gears respectively, clutches for independently clutching said loose gears and said motor shaft to said drive shaft, means for selectively engaging said clutches, a slidable bar connected with said foot pedal for operation thereby, means for normally holding said bar in position to prevent operation of said selecting means and means for causing engagement of said first clutch operable by the movement of the selecting means associated with the intermediate and slow speed clutches and reverse clutch.

5. In a speed changing transmission device for motor vehicles having a motor shaft, a drive shaft and a foot pedal, the combination of a counter shaft parallel with the drive shaft, a gear secured to said motor shaft, a gear loose on said counter shaft meshing with said first gear, a clutch for clutching said loose gear to said counter shaft, gears for intermediate and slow speeds and for reverse loosely mounted on said drive shaft, gears secured to said counter shaft for driving said loose gears respectively, clutches for independently clutching said loose gears and said motor shaft to said drive shaft, means for selectively engaging said clutches, a slidable bar connected with said foot pedal for operation thereby, means for normally holding said bar in position to prevent operation of said selecting means, a slidable rod connected with said first clutch for operating the same, means normally holding said rod in disengaging position, and arms connected with said rod for operating the same, said arms being engaged by the selecting means associated with the intermediate and slow speed clutches and reverse clutch when any one of these clutches is operated.

6. In a speed changing transmission device for motor vehicles having a motor shaft and a drive shaft, the combination of a counter shaft parallel with the drive shaft, a gear secured to said motor shaft, a gear loose on said counter shaft meshing with said first gear, a clutch for clutching said loose gear to said countershaft, means for normally holding said clutch out of clutching engagement, gears for intermediate and slow speeds and for reverse loosely mounted on said drive shaft, gears secured to said counter shaft which drive said loose gears respectively when said clutch is engaged and which remain idle when said clutch is disengaged, clutches for independently clutching said loose gears to said drive shaft, and a clutch for clutching said motor shaft directly to said drive shaft for high speed.

In testimony whereof I hereunto affix my signature.

JOHN H. SPANGLER.